O. SCHALLER.
VEHICLE WHEEL.
APPLICATION FILED JUNE 26, 1913.
1,105,211.
Patented July 28, 1914.
3 SHEETS—SHEET 1.
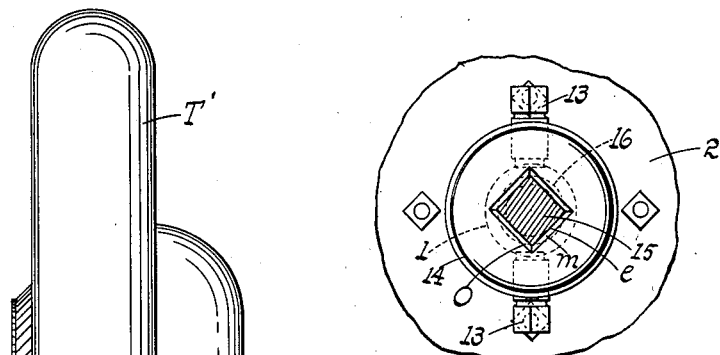
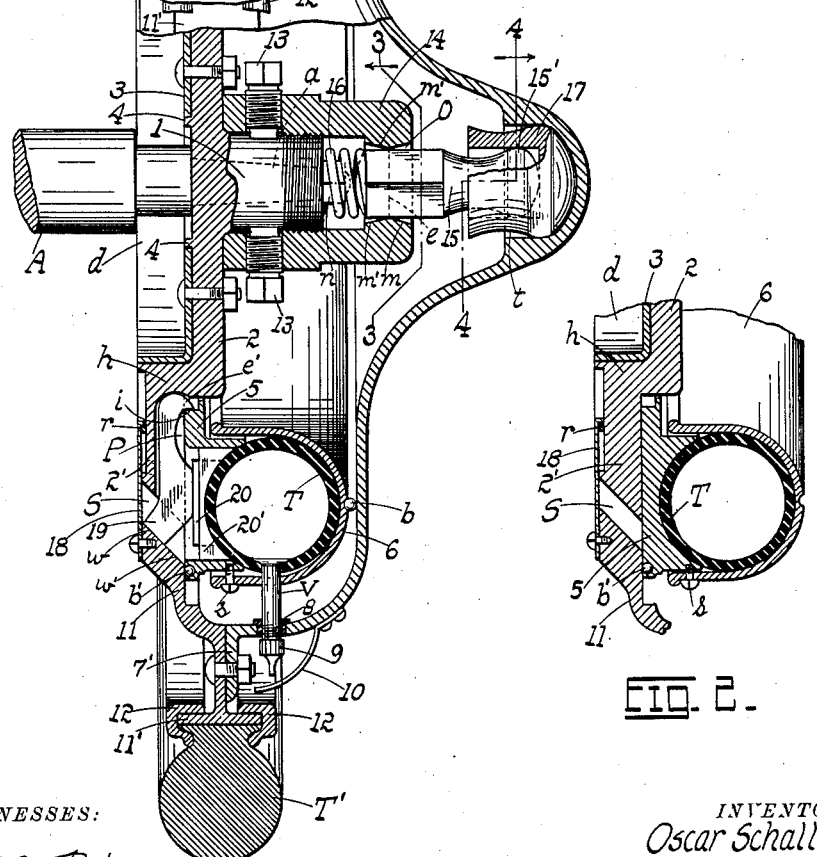

O. SCHALLER.
VEHICLE WHEEL.
APPLICATION FILED JUNE 26, 1913.

1,105,211.

Patented July 28, 1914.
3 SHEETS—SHEET 2.

WITNESSES:
Harry A. Bunck
Fannie E. Weber

INVENTOR.
Oscar Schaller
BY Emil Starea
ATTORNEY.

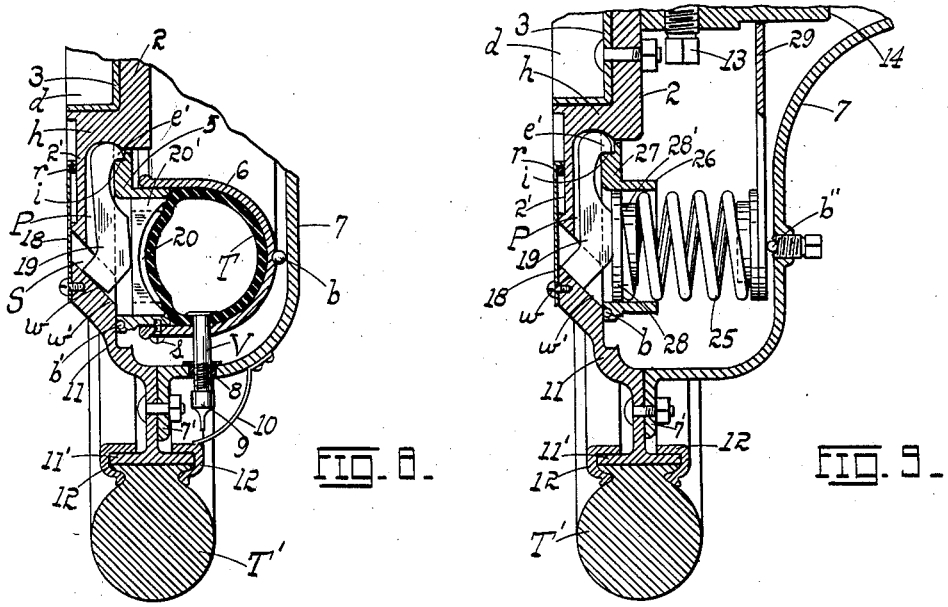
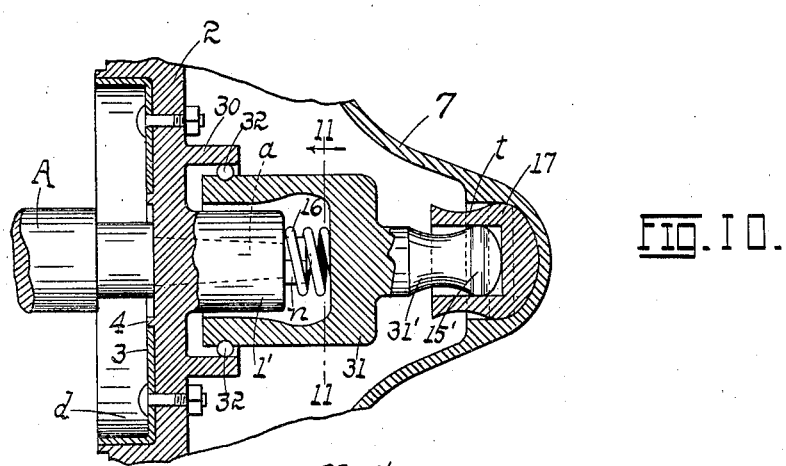
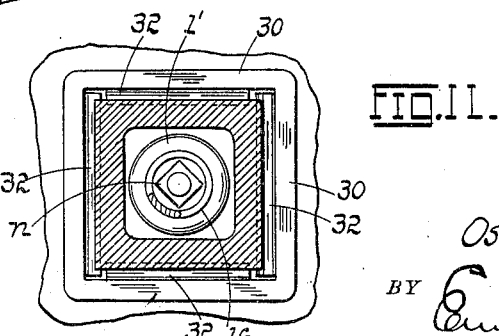

UNITED STATES PATENT OFFICE.

OSCAR SCHALLER, OF WEBSTER GROVES, MISSOURI.

VEHICLE-WHEEL.

1,105,211.

Specification of Letters Patent. Patented July 28, 1914.

Application filed June 26, 1913. Serial No. 775,933.

*To all whom it may concern:*

Be it known that I, OSCAR SCHALLER, a citizen of the United States, residing at Webster Groves, in the county of St. Louis and State of Missouri, have invented certain new and useful Improvements in Vehicle-Wheels, of which the following is a full, clear, and exact description, reference being had to the accompanying drawings, forming a part hereof.

My invention has relation to improvements in vehicle-wheels; and it consists in the novel details of construction more fully set forth in the specification and pointed out in the claims.

Figure 5:
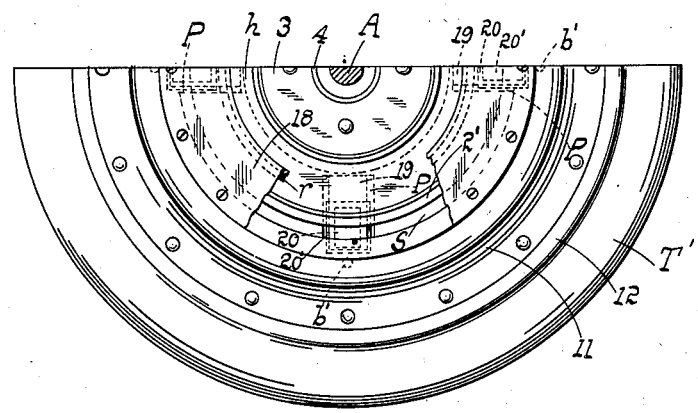
Figure 6:
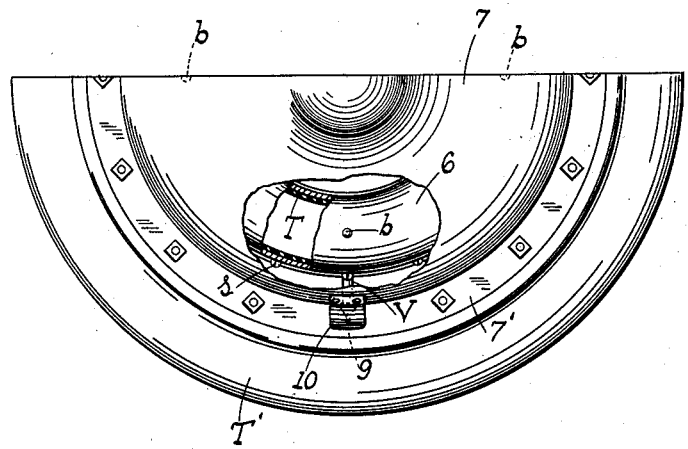
Figure 7:
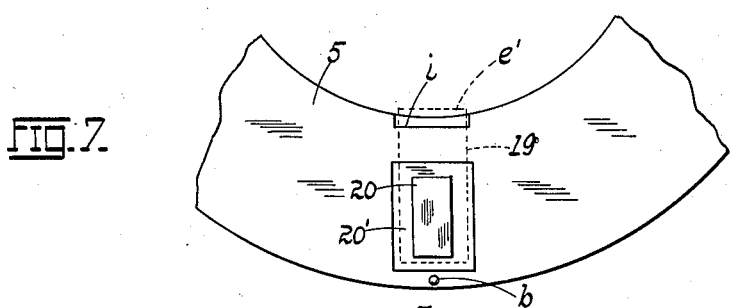
Figure 4:
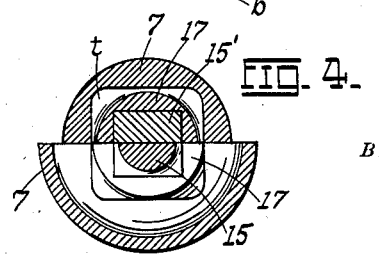

In the drawings, Figure 1 is a combined central cross-section and part edge elevation of a vehicle wheel showing one form of my invention; Fig. 2 is a cross-sectional detail taken through the inflatable tube, the channel ring in which the same is deposited, and the flange of the inner disk supporting said ring; Fig. 3 is a cross-sectional detail on the line 3—3 of Fig. 1; Fig. 4 is a combined cross-sectional detail and part elevation on the zig-zag line 4—4 of Fig. 1; Fig. 5 is an inner face view of one-half of the wheel, parts being removed; Fig. 6 is an outer face view of one-half of the wheel, parts being removed; Fig. 7 is an inner face view of the portion of the channel ring (carrying the inflatable tube) at a point opposite the dog-actuated shock-absorbing blocks; Fig. 8 is a sectional detail on the order of the bottom portion of Fig. 1, showing the inflatable tube under considerable compression; Fig. 9 is a view similar to the bottom portion of Fig. 1 showing a modified form of resilient member; Fig. 10 is a view similar to the sectional detail at the middle of Fig. 1 showing a modified form of flexible joint; and Fig. 11 is a cross-section on the line 11—11 of Fig. 10.

The object of my invention is to construct a vehicle wheel provided (in one of its forms) with an inflatable tire-tube so positioned relatively to the tread of the wheel and so protected as to entirely escape the danger of puncture by sharp objects encountered by the wheel as it rolls over the ground; one which will absorb to the greatest advantage the shocks incident to the travel of the vehicle and thus give to the occupants of the vehicle a greater amount of comfort; one responsive to impacts against objects encountered on the road and yielding in such a way as not to shake the occupants; one which rides easy and with a minimum amount of friction; one which is dust-proof; one susceptible of various modifications; and one possessing further and other advantages better apparent from a detailed description of the invention which is as follows:—

Referring to the drawings, and for the present to Figs. 1 to 8 inclusive, A represents the driven axle or shaft of the wheel, to the terminal spindle *a* whereof the wheel is rigidly secured, a clamping nut *n* being passed over the end of the spindle as well understood in the art, the said spindle being passed through the central hollow cylindrical boss 1 forming an integral part of the body portion or main plate 2 of the wheel, said member 2 being in the form of a disk, and being provided with an offset *h* projecting inwardly, said offset having formed integrally therewith a marginal flange 2'. To the inner face of the disk is bolted or otherwise secured a flanged annular cover plate 3 conformable to the depression *d* formed by the offset *h* with the portion 2, the inner edge of the plate 3 bearing against an annular rib 4 cast with the plate 2. Deposited on the outer face of the flange 2' and surrounding the offset or wall *h* is a flanged channel ring 5, the cross-section of the channel being dish or basin-shaped and somewhat less than a semi-circle in depth (Figs. 1, 2), said basin affording a proper contour for the reception and support of the inner peripheral walls of the inflatable tire-tube T which latter is constructed by any of the approved methods known to the art. The outer portions of the preipheral walls of the tube T are protected and supported by the annular channel ring or casing 6, whose walls overlap exteriorly the walls of the ring 5 (Figs. 1, 2) the outer overlapping portions being secured if desired to the ring 5 by screws *s*. The tube T is provided with the usual check-valve V through which it may be inflated, as well understood in the art, the valve being passed through the walls of the ring 6 and through the outer cover plate 7 forming a component part of the wheel and which will presently be again referred to. It may be stated in passing that the air valve V passes through a packing ring 8 in the member 7 to prevent the escape of the lubricant or oil generally present in the chamber of the cover plate for lubricating the necessary parts within as presently to be made quite obvious. The projecting end or screw-cap 9 of the valve is protected by a flexible leather or equivalent flap 10 secured to the member 7. The plate 7 is provided with a marginal flange 7' through which the same is bolted to the web portion of the ring 11 forming the immediate support for the outer tire or tread member T' of the wheel, the said member T' being held to the outer flange 11' of the ring 11 by clamping rings 12, 12, or any equivalent mechanical manner. For convenience, the flanged disk 2 may be considered as the inner relatively stationary or fixed section of the wheel, the flanged members 7, 11 jointly constituting the outer yielding section, the two sections rotating as a unit in the operation of the wheel. The members 5, 6, which virtually incase the tube T may be said to be supported by the fixed section of the wheel.
Screwed over the boss 1 and bearing against the disk 2, and held tightly in place by set screws 13, is a socket or cup 14, in the bottom of which is formed a square opening O bounded by plane faces $m$, $m'$, converging inwardly from opposite directions and intersecting in straight knife-edges $e$ disposed in a central plane between the opposite faces of the bottom of the socket. In this opening loosely fits the square shank of a link 15 between which and the end of the boss 1 is interposed (within the chamber of the cup) an anti-rattling spring 16 which surrounds the nut $n$. The outer end of the link 15 terminates in a head having a square portion 15' which snugly enters the square-socket of a substantially square head 17 having a partly spherical base which is in turn loosely received by a socket $t$ (conformable to said head) formed in the central raised portion or crown of the plate 7, the rounded character of the peripheral walls of the head 17 permitting the axis of the link 15 to oscillate out of alinement with the axis of the wheel with any upward movement (in a plane across said axis) of the yielding section of the wheel due to compression of the tube T. Between the members 6 and 7 are interposed at intervals ball-bearings $b$ to allow for ready play of the member 7 over the member 6.

When the parts described above are assembled, an annular space or opening S is left between the outer edge of the flange 2' and the inner edge of the ring 11, said space being covered by an annular dust plate 18 secured to the ring 11 but free to play over the inner face of the flange 2', a suitable packing ring $r$ of leather, felt or the like being interposed between said flange and dust plate. Disposed at intervals on the outer face of the flange 2' are pockets P open on the side facing the ring 5, and likewise open to the annular space S. In practice four such pockets are sufficient. In each pocket is deposited a dog 19 having a side view substantially as shown in Fig. 1, the inner end of the dog terminating in a fulcrum edge $e'$ bearing on a fulcrum ledge $i$ forward for this specific purpose on the ring 5. The outer face of the dog is plane and engages in turn a movable block or shock absorber 20 fitting loosely in an enveloping hollow block 20' which in turn operates loosely in an opening formed for its reception in the ring 5, the outer faces of the blocks being contoured to correspond with the contour of the channel of the ring 5, and permanently bearing against the tube T, whereby said tube has an uninterrupted support or bearing throughout the full circumference thereof. Normally, the outer basin shaped surfaces of the blocks 20, 20' are in alinement, that is to say, they form one continuous rounded supporting face for the tube T, the inner block being the thicker and partially projecting beyond the inner face of the block 20', said projecting portion engaging the flat face of the dog, which face (except as hereinafter described) is out of contact with the inner face of the block 20' (Fig. 1). The outer end of the dog projects out of the pocket P and into and across the space S, the free edge $w$ of the dog being inclined to the axis of the wheel and bearing against the correspondingly inclined face $w'$ of the ring 11 (Fig. 1). It will be seen from this that with any upward movement of the ring 11 due to a yielding and compression of the tube T under excessive load, or as a result of impact against obstruction, the inclined face $w'$ will oscillate the dog outwardly, that is to say toward the block 20 thereby forcing the latter against the tube T; and with excessive rise of the ring 11 due to increased load, the dog will be forced against the outer block 20' thereby in turn likewise forcing this block against the tube T (Fig. 8). The play of the ring 11 along the ring 5 is facilitated by the ball bearing $b'$ as shown. Any rotary creeping of the ring 5 about the disk 2 is prevented by the dogs 19, the engagement of whose straight fulcrum edges with the ledges $i$ will prevent any rotary motion on the part of the ring 5. It may be stated in passing that with the exception of the portions opposite the pockets P, the outer edges of the flanges 2' follow the dip of the faces $w'$ of the ring 11, thereby affording a maximum amount of bearing surface between the flanges 2' and the ring 5.

The operation of the wheel may be described as follows:—The connection between the socket 14 and the head 17 is in the nature of a universal or flexible joint, the link 15 oscillating freely about the edges e, and the head 17 playing freely (in radial planes) in the socket t of the crown of the cover plate 7 but locked thereto rotarily. The plate 7 being bolted to the ring 11 it follows that with any compression of the resilient tube T the yielding section of the wheel will play freely over the fixed section 2, a compression of the tube causing the movable section to play upward, and a subsequent expansion of the tube (due to relaxation from the pressure) causing the movable section to move downward (the resistance due to load always acting vertically over the point where the tread of the wheel is in contact with the ground). With a sufficient compression of the tube T, generally following with a passage of the wheel over a rough surface or obstruction the bottom dog (or that disposed momentarily in the line through which the resistance acts) will be forced first against the inner block 20, and if the compression is great, then against the outer block 20', thus forcing the blocks against the sides of the walls of the already compressed tube and compressing the latter (horizontally) to still a greater degree at the points opposite the blocks, whereby the shocks incident to the vertical compression are advantageously absorbed, the advantages of the absorption continuing with a relaxation of the compressed tube, the blocks resuming in succession their normal positions when the tube T is relieved of the excessive pressure which forced them inward against the tube. In these vertical movements of the yielding section of the wheel, the link 15 oscillates freely about the edges e, the valve V playing freely through the packing ring 8, and the dust ring 18 freely playing over the face of the flange 2' of the disk 2. In these movements the plate 7 freely plays over the ring 6 by reason of the ball bearings b, the bearings b' serving a like function between the parts 5 and 11. By virtue of the square or polygonal connecions between the parts 14, 15, 17, 7, a rotation imparted to the disk 2 from the axle A will be communicated to the cover plate 7 and the yielding wheel-section of which it forms a part, as clearly obvious from the drawings.

In lieu of the inflatable tube T, I may substitute a series of resilient devices such as coiled springs 25, the inner end of the spring being received in a socket 26 of a ring 27 deposited on the flange 2' of the disk 2, the dog 19 in that case bearing against the inner face of a shock-absorbing disk 28 operating loosely in the socket 26, and providing a seat for the spring, the disk being preferably provided with a cylindrical boss 28' about which the spring is coiled. The opposite ends of the springs bear against and are supported by, a plate or disk 29 slipped over the socket 14, suitable ball bearings b'' being interposed between said disk and the cover 7. This modification referred to is illustrated in Fig. 9.

In lieu of the lever or stud 15 to effect the flexible joint between the fixed and yielding sections of the wheel, I may provide the disk 2 with a central square flange 30, as shown in the modifications in Figs. 10 and 11, the disk being in that case provided with a central threadless boss 1'. Inserted into the chamber of the flange 30 is a corresponding head 31 chambered to pass freely around the boss 1', suitable rollers 32 being disposed between the outer faces of the head 31 and the inner faces of the flange. The head 31 terminates in a stem 31' which in turn enters a head 17 in the crown of the cover plate 7, the same as in Fig. 1. In particulars not referred to in connection with the modifications in Figs. 9, 10, 11, the construction is the same as in the first and main form described, and need not be repeated at this point.

Having described my invention, what I claim is:—

1. In a vehicle-wheel, an axle, an outer tread member flexibly jointed thereto, a resilient member interposed between the tread and the axis of the wheel and disconnected from the tread member, shock-absorbing devices mounted opposite the resilient member and engaging the inner face of the same, and means on the tread member for controlling said devices.

2. In a vehicle-wheel, an inner rotatable section, an outer rotatable section having a yielding movement relatively to the inner section in planes parallel to the plane of rotation of the wheel, an inflatable tube mounted on the inner section, a casing for said tube, and suitable shock-absorbing devices mounted on the inner section opposite the tube, and responding to the yielding movements of the outer section and coöperating with the inflatable tube.

3. In a vehicle-wheel, an inner rotatable section, an outer rotatable section, a flexible joint connecting the sections disposed about the axis of the wheel, and permitting the outer section to yield in the plane of rotation of the wheel, a resilient member interposed between the sections, and suitable shock-absorbers mounted opposite to, and engaging the resilient member and actuated by the yielding movement of the outer section.

4. In a vehicle-wheel, an inner section, an outer section jointed flexibly thereto about the axis of the wheel, an inflatable tube carried by the inner section, a tread member on the outer section, suitable shock-absorbing devices mounted opposite to, and engaging the tube, and means responsive to movements of the outer section due to flexure of the joint for driving the shock-absorbing devices against the tube.

5. In a vehicle-wheel, an inner section, an outer section jointed flexibly thereto about the axis of the wheel, an inflatable tube, an inner channel ring for the tube resting on the inner section of the wheel, an outer casing for the tube coupled to the inner channel ring, the latter being provided with openings opposite the inner peripheral walls of the tube, suitable pockets being formed in the inner wheel section opposite said openings, an oscillating dog in a pocket, movable blocks operating through the openings against the inner walls of the tube and engaged by said dogs, the latter projecting from the pockets and terminating in inclined edges, the outer wheel section being spaced from the outer edge of the inner section and provided with inclined surfaces engaging the inclined edges of the dogs, whereby upon a compression of the tube the dogs are successively forced against the blocks and the latter against the tube and the shocks thus absorbed, and a tread member on the outer wheel section.

6. In a vehicle-wheel provided with a resilient member, a ring for supporting said member, a tread-supporting member for said wheel, movable blocks engaging said resilient member, and devices opposite the resilient member actuated by the movements of the tread-supporting member across the axis of rotation of the wheel for forcing said devices against the blocks and the latter against the resilient member for the purpose set forth.

7. In combination with a shaft, an inner wheel section secured thereto, an axially disposed socket secured to said wheel-section, said socket terminating in a bottom having a square opening provided with a continuous knife-edge between opposite faces of the said socket bottom, a link having a square shank inserted in said opening, a rounded head gripping the outer end of the link, an outer cover plate having a central rounded crown formation receiving said head and being rotarily locked thereto, but allowing the head to freely play therein in planes cutting across the plane of rotation of the wheel, an inner channel ring on the inner wheel section, an outer channel ring secured thereto, an inflatable tube incased between the rings, a ring coupled to the outer cover plate and spaced from the outer edges of the inner wheel-section, and provided with a free face inclined to the axis of the wheel, oscillatable dogs engaging the inner channel ring, the inner wheel section being provided with pockets for receiving the dogs, the latter projecting out of said pockets and terminating in inclined or bevel ends engaging the inclined face of the ring coupled to the cover plate, the cover plate and its ring forming the outer wheel section yieldable in planes across the axis of the wheel, a tread on said outer wheel section, and movable blocks operating through the walls of the inner channel ring against the tube and actuated by the dogs aforesaid, the latter being forced against the blocks with an undue compression of the tube and a resulting movement of the outer wheel section.

In testimony whereof I affix my signature, in presence of two witnesses.

OSCAR SCHALLER.

Witnesses:
 EMIL STAREK,
 FANNIE E. WEBER.